Jan. 1, 1963   KAZUYA FUJITA   3,071,226
ELECTROMAGNETIC CLUTCH
Filed Nov. 3, 1959
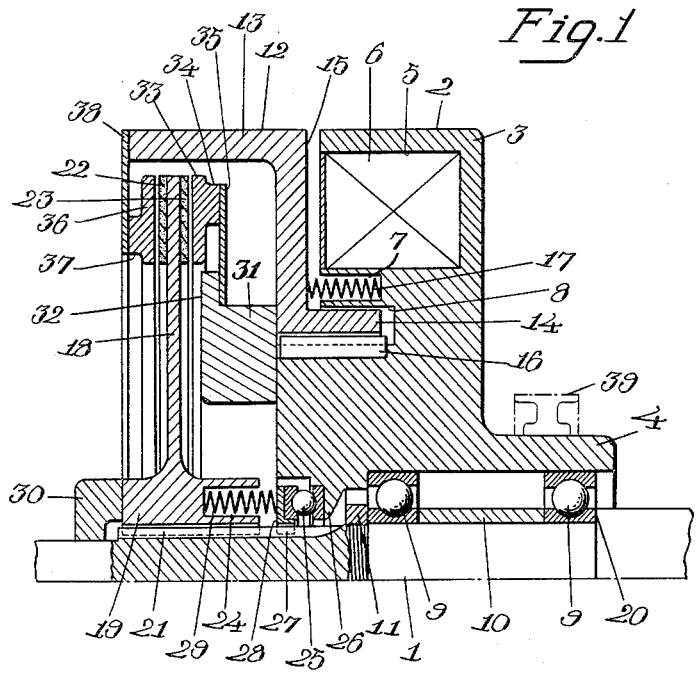
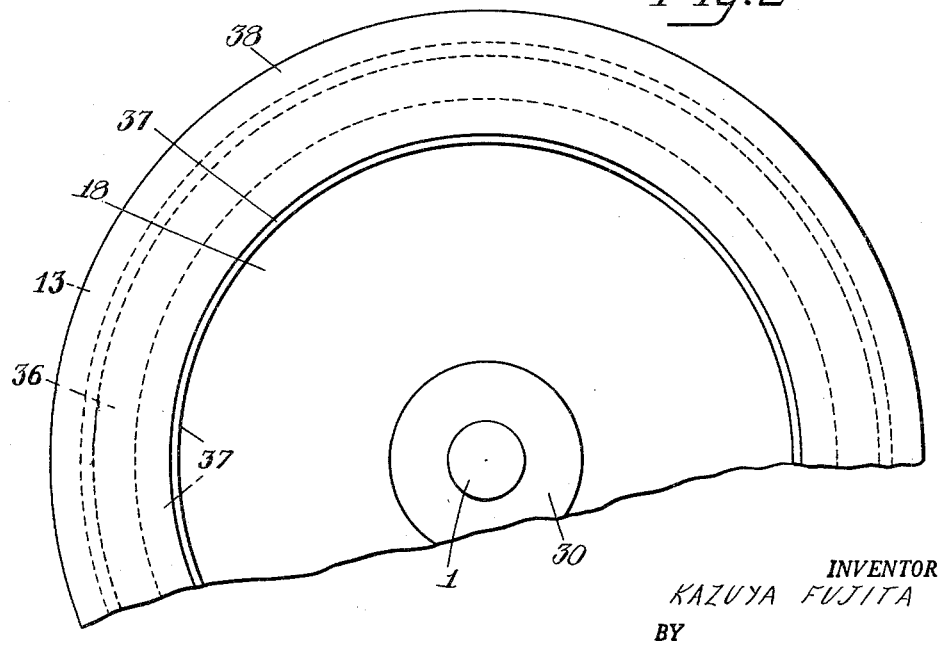
INVENTOR:
KAZUYA FUJITA
BY
Richardson, David and Nordon
ATTYS.

United States Patent Office 3,071,226
Patented Jan. 1, 1963

3,071,226
ELECTROMAGNETIC CLUTCH
Kazuya Fujita, Tobashi, Mieken, Japan, assignor to Shinko Denki Kabushiki Kaisha, Tokyo, Japan
Filed Nov. 3, 1959, Ser. No. 850,596
3 Claims. (Cl. 192—84)

This invention relates to an electromagnetic clutch, more particularly a resilient friction disc supporting means in an electromagnetic clutch.

An object of the present invention is to provide an electromagnetic clutch of a type in which a clutch facing is set on each side of a rotary clutch plate to transmit a torque and a friction disc having a friction surface formed thereon is engageably set opposite each clutch facing, and even if the cooperating surfaces of said rotary clutch plate and both friction discs are somewhat uneven, the mutual contact will nevertheless be complete by virtue of the resilient supporting means.

Another object of the present invention is to provide an electromagnetic clutch wherein, even if the wear of each frictional surface is oblique to a plane perpendicular to the rotational axis of the clutch, both the clutch facing and friction disc need not be replaced but only the clutch facing needs to be replaced.

For the above mentioned objects, according to the present invention, both of said friction discs are axially yieldingly connected to the clutch through flexible discs.

An embodiment of the present invention will be explained in the following specification with reference to the accompanying drawings in which:

FIGURE 1 is a longitudinal sectional side view of the upper half of a clutch embodying the invention; and FIGURE 2 is a fragmentary end elevation of the same embodiment seen from the left in FIGURE 1.

In the drawings, 1 is a horizontally extending rotary shaft and 2 is an electromagnetic yoke comprising an annular body 3, a hollow hub or boss 4 projecting rightward near the center of said body 3, an annular recess 5 opening leftward in the peripheral portion of said annular body 3 and an exciting coil or energizing winding 6 is disposed in said recess 5. A plurality of holes or axially extending bores 7 open leftward and are located nearer to the axis of the clutch than the recess 5 of the annular body 3. The bores 7 are arranged at regular intervals around a common circle. Still closer to the axis than the bores 7 is an annular recess 8 opening leftward. Said electromagnetic yoke 2 is supported on ball bearings 9 fitted on the rotary shaft 1. 10 is a spacer sleeve to separate the bearings 9 from each other and is loosely fitted on the rotary shaft 1. 11 is a nut screwed on the rotary shaft 1 and prevents the axial movement of the bearings 9 along the shaft 1 in cooperation with a shoulder 20 formed on the shaft 1. 12 is a hollow cylindrical axially movable armature member formed of a magnetic material and having a stepped part 15. The armature 12 comprises an annular lip portion 14 which is freely axially movable in the recess 8. The armature member 12 is connected for rotation with the hub 4 by means of a key 16 fitted in the recess 8.

Further, the armature member 12 is yieldingly pressed leftward by spiral springs 17 loosely inserted in the respective bores 7. 18 is a rotary disc or clutch plate formed integrally with a hollow boss or hub 19 so as to radially extend from the substantially central part of hub 19, the hub 19 being splined to the rotary shaft 1 by a splined joint 21 on the inner periphery of the boss 19. On the opposite sides near the peripheral edge of the rotary disc 18 are secured an annular left clutch facing 22 and a right clutch facing 23 of the same shape substantially concentrically with the axis of the rotary shaft 1. A plurality of bores 24 opening rightward are arranged at regular intervals around the hub 19. 25 is a thrust bearing held in position by a receiving seat 26 formed on the inner periphery of the yoke 2 and a retaining ring 28 splined to the rotary shaft 1 by a splined joint 27. 29 is a spiral spring loosely inserted in each bore 24 in the hub 19 and presses with its right end against the retaining ring 28 so as to constantly press the rotary disc 18 leftward. 30 is a fixed collar of L-shaped cross-section fitted and secured to the rotary shaft and abuts the left end surface of the hub 19 so as to restrict the leftward movement of the rotary disc 18 due to the springs 29. 31 is an annular member having a radially outwardly projecting flange 32 at the left end and is secured by welding or any other means to the left side surface of the yoke 2 in such manner that a part of the right side surface of member 31 abuts a part of the inner surface (left side surface) of the movable armature member 12 so as to limit the leftward movement of armature member 12 due to the springs 17. 33 is an annular right friction disc which has a rightward projecting annular rim 34 and is secured by this annular projecting part to the left side surface of the peripheral edge of an annular flexible disc 35 by welding or any other means. Further, the left side surface of the right friction disc 33 defines a friction surface which confronts the right side surface of the right clutch facing 23 with a proper clearance by securing the flexible disc 35 near its inner periphery to the flange 32 of the annular member 31 by welding or any other means. 36 is an annular left friction disc, having a leftward annular projecting rim 37 and is secured by this annular rim to the right side surface, near its inner peripheral edge, to an annular flexible disc 38 by welding or any other means. Further, the right side surface of the left friction disc 36 defines a friction surface which confronts the left side surface of the left clutch facing 22 with a proper clearance by securing the flexible disc 38 at its peripheral edge to the left end of the outer cylindrical part 13 of the armature member 12 by welding or any other means. 39 is a pulley fixed to the outer periphery of the hub 4 by keying, welding or any other means.

The electromagnetic coupling according to the present invention is constructed as described above. Therefore, if the coil 6 is energized, for example, with the rotary shaft 1 considered to be the driving member, the armature member 12 together with the flexible disc 38 will be pulled rightward against the action of the springs 17 and the left friction disc 36 will be pressed into contact with the left clutch facing 22. However, if the clearance between the left side surface of the yoke 2 and the right side surface of the armature member 12 and the clearance between the right end surface of the inner cylindrical lip 14 of the armature member 12 and the bottom surface of the recess 8 in the yoke 2 are respectively made larger than the clearance between the left friction disc 36 and the left clutch facing 22, when the armature member 12 moves rightward integrally with the flexible disc 38, the rotary disc 18 will be pressed rightward against the action of springs 29 and the left and right clutch facings 22 and 23 respectively, will be held and yieldingly pressed between the rightward moving friction disc 36 and the axially relatively stationary friction disc 33. Therefore, the rotation of the rotary shaft 1 and therefore of the rotary disc 18 will be transmitted to the yoke 2 and therefore to the pulley 39 through both friction discs 36 and 33, the flexible discs 38 and 35, movable member 12 and annular member 31. When the exciting coil 6 is de-energized, the above mentioned movable parts will return to the illustrated positions due to the springs 17 and 29 and the transmission of torque will be interrupted. That is to say, according to the present invention, as the friction discs 36 and 33 located on both sides of the rotary disc 18 provided with the clutch facings 22 and 23 are so made as to be connected to the armature member 12 and the annular member 31 through the flexible discs 38 and 35, respectively, even if both clutch facings 22 and 23 and the friction discs 36 and 33 should be improperly aligned with each other, the cooperating parts would nevertheless be in contact with each other throughout their entire surfaces and the transmission torque would be effected smoothly.

In a conventional system, wherein the friction discs 36 and 33 would be fitted rigidly, in case the contact surfaces of the clutch facings 22 and 23 and the friction discs 36 and 33 have worn slightly obliquely, it would be necessary to replace both of the clutch facings and both of the friction discs. However, according to the present invention, even in such case, only the two clutch facings 22 and 23 require replacement and the cost of maintenance is thereby reduced.

What I claim is:

1. An electromagnetic clutch comprising a revoluble driving member; a revoluble driven member coaxial with said driving member; a clutch plate axially slidably connected to one of said members for rotation therewith, said clutch plate having two oppositely directed flat annular friction facings coaxial with said members; means defining a first flat annular friction surface confronting one of said facings; electromagnetic means connected to the other of said members for rotation therewith, said electromagnetic means consisting of an energizing winding and an axially movable armature member which is selectively displaceable axially of said members upon energization or deenergization of said winding; means defining a second flat annular friction surface confronting the other one of said facings; resilient means axially yieldingly connecting said means defining said first friction surface to said other member for coaxial rotation together; further resilient means axially yieldingly connecting said means defining said second friction surface to said electromagnetic means for coaxial rotation together; and spring means yieldingly urging said friction surfaces into spaced relationship with respect to said friction facings, said friction facings being yieldingly pressed between said friction surfaces when said winding is energized.

2. A clutch according to claim 1, wherein said electromagnetic means, said other member and both of said friction surface defining means each comprises an annular portion concentric with their common rotational axis, all of said annular portions being spaced apart, and in which said first-named resilient means axially yieldingly interconnects said annular portions of said other member and said means defining said first friction surface for rotation together, and wherein said further resilient means axially yieldingly interconnects said annular portions of said electromagnetic member and said means defining said second friction surface for rotation together.

3. A clutch according to claim 2, wherein said annular portions interconnected by said first-named resilient means are concentric and of different diameters, and in which said annular portions interconnected by said further resilient means are concentric and of different diameters, each of said resilient means being a flat annular flexible member the plane of which is perpendicular to the common rotational axis of said members.

References Cited in the file of this patent

UNITED STATES PATENTS

| 2,664,981 | D'Ozouville | Jan. 5, 1954 |
| 2,739,683 | Gamundi | Mar. 27, 1956 |
| 2,880,595 | McGuffey et al. | Apr. 7, 1959 |
| 2,897,933 | Maurice et al. | Aug. 4, 1959 |
| 2,914,156 | Harting | Nov. 24, 1959 |